(12) United States Patent  (10) Patent No.: US 9,138,648 B2
Gavin  (45) Date of Patent: *Sep. 22, 2015

(54) SYSTEM AND METHOD FOR DYNAMICALLY LOADING GAME SOFTWARE FOR SMOOTH GAME PLAY

(75) Inventor: Andrew Scott Gavin, Pacific Palisades, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 10/873,066

(22) Filed: Jun. 21, 2004

(65) Prior Publication Data

US 2004/0229701 A1  Nov. 18, 2004

Related U.S. Application Data

(63) Continuation of application No. 10/267,176, filed on Oct. 8, 2002, now Pat. No. 6,764,403.

(60) Provisional application No. 60/328,479, filed on Oct. 10, 2001.

(51) Int. Cl.
*A63F 13/00* (2014.01)
*A63F 13/50* (2014.01)
*A63F 13/52* (2014.01)
(Continued)

(52) U.S. Cl.
CPC ................. *A63F 13/50* (2014.09); *A63F 13/52* (2014.09); *A63F 13/10* (2013.01); *A63F 13/55* (2014.09); *A63F 13/56* (2014.09); *A63F 2300/203* (2013.01); *A63F 2300/206* (2013.01); *A63F 2300/207* (2013.01); *A63F 2300/534* (2013.01); *A63F 2300/552* (2013.01);
(Continued)

(58) Field of Classification Search
CPC ......... A63F 13/50; A63F 13/52; A63F 13/55; A63F 13/56; A63F 2300/64; A63F 2300/203; A63F 2300/206; A63F 2300/207; A63F 2300/534
USPC .......... 345/544, 582; 715/726, 745; 463/6, 31
See application file for complete search history.

(56) References Cited

U.S. PATENT DOCUMENTS 4,321,635 A  3/1982 Tsuyuguchi
4,727,365 A  2/1988 Bunker et al.
(Continued)

FOREIGN PATENT DOCUMENTS

JP  H5-27779  4/1993
JP  2000-218036  8/2000
(Continued)

OTHER PUBLICATIONS

"Mario Kart 64 Operation Card." Nintendo Co., Ltd. Copyright 1997. 2 pages.*

(Continued)

*Primary Examiner* — William H McCulloch, Jr.
(74) *Attorney, Agent, or Firm* — Lewis Roca Rothgerber LLP

(57) ABSTRACT

A system and method are disclosed for dynamically loading game software for smooth game play. A load boundary associated with a game environment is identified. A position of a character in the game environment is then monitored. Instructions corresponding to a next game environment are loaded into a memory when the character crosses the load boundary, such that game play is not interrupted.

19 Claims, 7 Drawing Sheets

(51) Int. Cl.
  *A63F 13/55* (2014.01)
  *A63F 13/56* (2014.01)
  *A63F 13/40* (2014.01)

(52) U.S. Cl.
  CPC ...... *A63F 2300/638* (2013.01); *A63F 2300/64* (2013.01); *Y10S 345/96* (2013.01)

(56) References Cited

U.S. PATENT DOCUMENTS

| | | | |
|---|---|---|---|
| 4,807,158 A | 2/1989 | Blanton et al. | |
| 4,860,197 A | 8/1989 | Langendorf et al. | |
| 4,905,168 A | 2/1990 | McCarthy et al. | |
| 4,943,908 A | 7/1990 | Emma et al. | |
| 4,980,823 A | 12/1990 | Liu | |
| 5,014,327 A | 5/1991 | Potter et al. | |
| 5,305,389 A | 4/1994 | Palmer | |
| 5,574,836 A | 11/1996 | Broemmelsiek | |
| 5,699,497 A | 12/1997 | Erdahl et al. | |
| 5,748,867 A | 5/1998 | Cosman et al. | |
| 5,769,718 A | 6/1998 | Rieder | |
| 5,899,810 A * | 5/1999 | Smith | 463/42 |
| 6,002,738 A | 12/1999 | Cabral et al. | |
| 6,319,129 B1 * | 11/2001 | Igarashi et al. | 463/31 |
| 6,320,580 B1 | 11/2001 | Yasui et al. | |
| 6,356,288 B1 * | 3/2002 | Freeman et al. | 715/867 |
| 6,361,438 B1 | 3/2002 | Morihira | |
| 6,411,298 B1 | 6/2002 | Goto et al. | |
| 6,496,189 B1 * | 12/2002 | Yaron et al. | 345/428 |
| 6,529,206 B1 | 3/2003 | Ohki et al. | |
| 6,738,059 B1 | 5/2004 | Yoshinaga et al. | |
| 6,744,442 B1 | 6/2004 | Chan et al. | |
| 6,764,403 B2 | 7/2004 | Gavin | |
| 6,803,910 B2 | 10/2004 | Pfister et al. | |
| 6,853,382 B1 * | 2/2005 | Van Dyke et al. | 345/544 |
| 6,864,895 B1 * | 3/2005 | Tidwell et al. | 345/522 |
| 6,903,738 B2 | 6/2005 | Pfister et al. | |
| 6,999,094 B1 | 2/2006 | Ito | |
| 7,293,235 B1 * | 11/2007 | Powers et al. | 715/706 |
| 8,062,128 B2 | 11/2011 | Jobe | |
| 2003/0058238 A1 * | 3/2003 | Doak et al. | 345/419 |
| 2012/0283026 A1 | 11/2012 | Gavin | |

FOREIGN PATENT DOCUMENTS

| | | | | |
|---|---|---|---|---|
| JP | 2001-079263 | | 3/2003 | |
| WO | WO 00/10130 | * | 2/2000 | G06T 7/20 |
| WO | WO 03/032127 | | 4/2003 | |

OTHER PUBLICATIONS

David R. Pratt, "A Software Architecture for the Construction and Management of Real-Time Virtual Worlds," Jun. 1993, pp. 62-67.
Bates, Jason, "Half-Life Review," IGN, Nov. 25, 1998.
Palmer, Chris et al., "Tile Based Games FAQ," GAMEDEV, Aug. 31, 2000.
White, Stephen, "The Technology of Jak & Daxter," Game Developer's Conference, Mar. 6, 2003.
PCT/US02/32420, International Search Report mailed Apr. 1, 2003.
U.S. Appl. No. 13/548,791 Final Office Action mailed Oct. 16, 2013.
U.S. Appl. No. 13/548,791 Office Action mailed Apr. 24, 2013.
U.S. Appl. No. 10/443,612 Final Office Action mailed Jun. 4, 2007.
U.S. Appl. No. 10/443,612 Office Action mailed Dec. 8, 2006.
U.S. Appl. No. 13/548,791 Office Action mailed Dec. 8, 2014.

* cited by examiner

SYSTEM AND METHOD FOR DYNAMICALLY LOADING GAME SOFTWARE FOR SMOOTH GAME PLAY

CROSS REFERENCE TO RELATED APPLICATIONS

The present application is a continuation of U.S. patent application Ser. No. 10/267,176 filed Oct. 8, 2002 now U.S. Pat. No. 6,764,403 and entitled "System and Method for Dynamically Loading Game Software for Smooth Game Play" which claims priority of U.S. Provisional Patent Application No. 60/328,479, filed Oct. 10, 2001 and entitled "Dynamic Loading of Game Software for Smooth Game Play," both of which are incorporated herein by reference in their entirety.

BACKGROUND OF THE INVENTION

1. Field of the Invention

This invention relates generally to electronic entertainment devices and relates more particularly to a system and method for dynamically loading game software for smooth game play.

2. Description of the Background Art

A virtual world represented by game software often includes more than one environment or level of game play. A character, controllable by the user, typically begins the game in one environment or level, and then progresses to other, often more challenging, environments or levels. Typically there is a pause in game play while the game transitions from one environment to another. The game screen may momentarily be blank or a "loading" screen may appear while the new environment or level is loaded from the game disc to the game system's memory. Loading times vary by game, but games with complex environments and characters may require significant loading times. Whether the loading time is short or significant, the flow of game play is interrupted.

In order to prevent the blank or loading screen from being displayed to a user, hallway or transition rooms may be presented to the user while software associated with a new game environment is loaded. Typically, hallway and transition rooms are areas of low detail that a character traverses to move between areas of high detail. When the user's character is in the area of low detail, the areas of high detail on either side of the hallway or the transition room are not shown to the user. Although this avoids displaying a blank or loading screen to the user, it is obvious to the user that the user is merely awaiting the new environment until real game play can continue.

Use of blank or loading screens, as well as traditional hallways or transition rooms makes obvious to the user that the user is suspended from actual game play pending the availability of the new environment. This interruption in game play spoils the realism of the game and alerts the user to a pause in game play.

SUMMARY OF THE INVENTION

In accordance with the invention, a system and method are disclosed for dynamically loading game software for smooth game play. A load boundary associated with a game environment is identified. A position of a character in the game environment is then monitored. Instructions corresponding to another game environment are loaded into a memory when the character crosses the load boundary, such that game play is not interrupted.

In a system according to the invention, an environment management engine is configured to identify a load boundary associated with a game environment, monitor the position of a character in the game environment, and load instructions corresponding to another game environment into a memory when the character crosses the load boundary. At least two memory segments are configured to store instructions for the game environment and to receive and store the instructions corresponding to the other game environment.

DETAILED DESCRIPTION OF THE INVENTION

Figure 1:
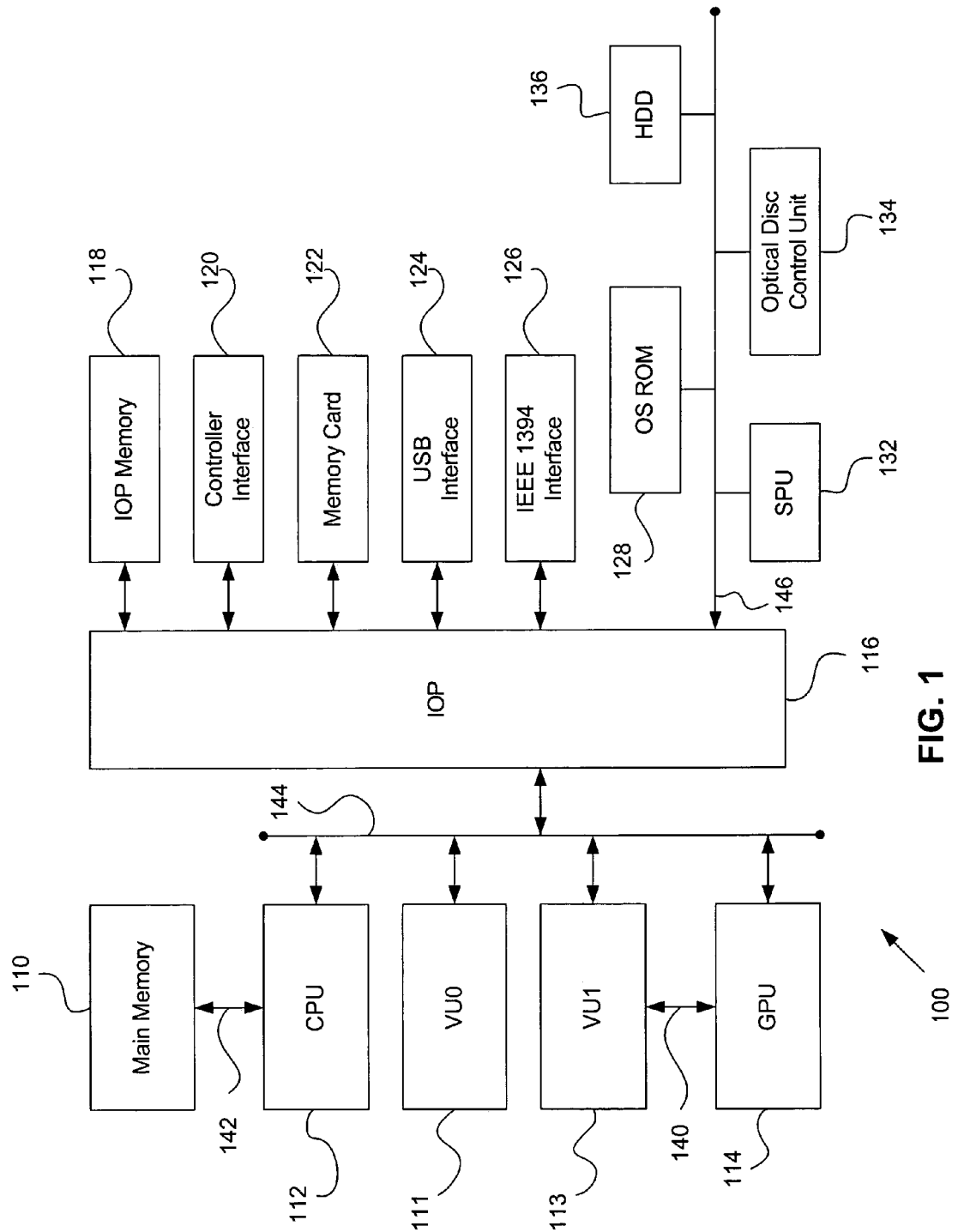
FIG. 1 is a block diagram of one embodiment of an electronic entertainment system, according to the invention.

FIG. 1 is a block diagram of one embodiment of an electronic entertainment system 100 according to the invention. System 100 includes, but is not limited to, a main memory 110, a central processing unit (CPU) 112, vector processing units VU0 111 and VU1 113, a graphics processing unit (GPU) 114, an input/output processor (IOP) 116, an IOP memory 118, a controller interface 120, a memory card 122, a Universal Serial Bus (USB) interface 124, and an IEEE 1394 interface 126. System 100 also includes an operating system read-only memory (OS ROM) 128, a sound processing unit (SPU) 132, an optical disc control unit 134, and a hard disc drive (HDD) 136, which are connected via a bus 146 to IOP 116. System 100 is preferably an electronic gaming console; however, system 100 may also be implemented as, for example, a general-purpose computer, a set-top box, or a hand-held gaming device.

CPU 112, VU0 111, VU1 113, GPU 114, and IOP 116 communicate via a system bus 144. CPU 112 communicates with main memory 110 via a dedicated bus 142. VU1 113 and GPU 114 may also communicate via a dedicated bus 140. CPU 112 executes programs stored in OS ROM 128 and main memory 110. Main memory 110 may contain prestored programs and may also contain programs transferred via IOP 116 from a CD-ROM, DVD-ROM, or other optical disc (not shown) using optical disc control unit 134. IOP 116 controls data exchanges between CPU 112, VU0 111, VU1 113, GPU 114 and other devices of system 100, such as controller interface 120. Although a CPU 112 is described, any other type of processor is within the scope of the invention.

GPU 114 executes drawing instructions from CPU 112 and VU0 111 to produce images for display on a display device (not shown). VU1 113 transforms objects from three-dimensional coordinates to two-dimensional coordinates, and sends the two-dimensional coordinates to GPU 114. SPU 132 executes instructions to produce sound signals that are output on an audio device (not shown).

A user of system 100 provides instructions via controller interface 120 to CPU 112. For example, the user may instruct CPU 112 to store certain game information on memory card 122 or may instruct a character in a game to perform some specified action. Other devices may be connected to system 100 via USB interface 124 and IEEE 1394 interface 126.

Figure 2:
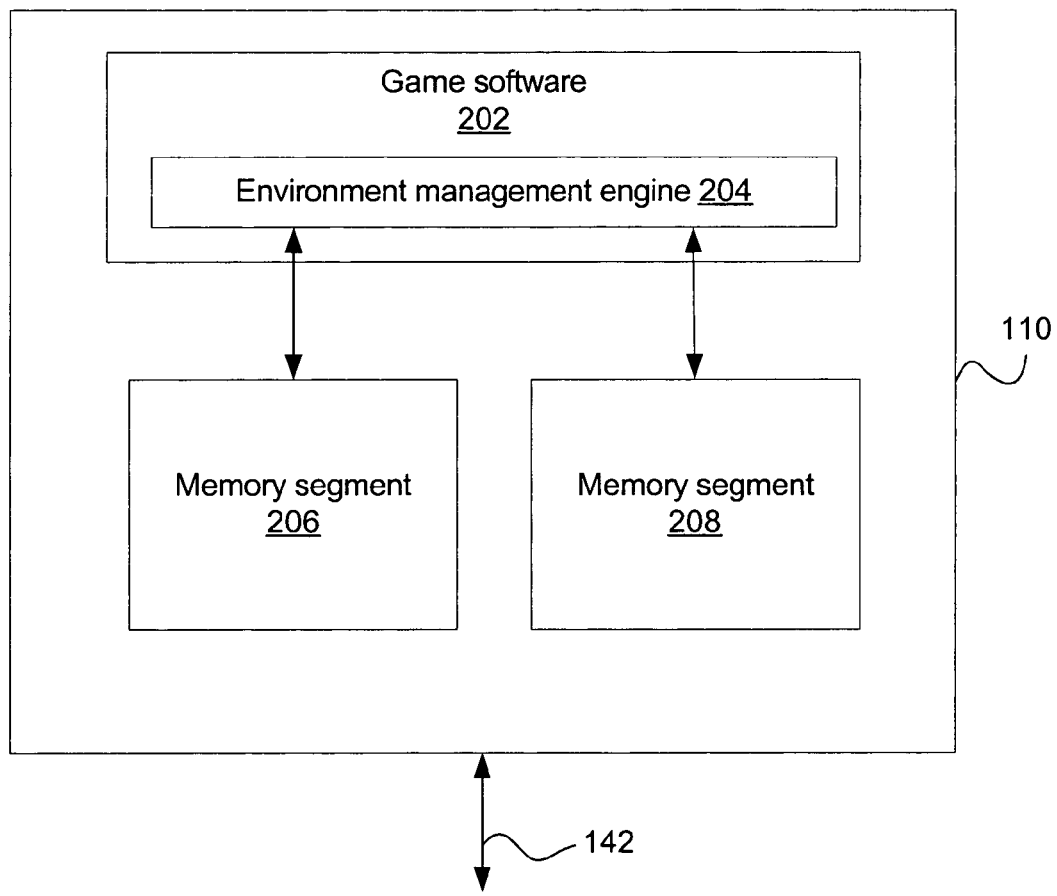
FIG. 2 is a block diagram of one embodiment of the main memory of FIG. 1, according to the invention.

FIG. 2 is a block diagram of one embodiment of main memory 110 of FIG. 1, according to the invention. Main memory 110 includes, but is not limited to, game software 202, a memory segment 206, and a memory segment 208. Game software 202 includes instructions executable by CPU 112, VU0 111, VU1 113, and SPU 132 that allow a user of system 100 to play a game. In the FIG. 2 embodiment, game software 202 is related to an action adventure game in which a user controls a character on a journey. In other embodiments, game software 202 may be related to any other type of game, including but not limited to other action adventure games, a role-playing game (RPG), and a civilization-building simulation game. Game software 202 also includes an environment management module 204.

Memory segment 206 and memory segment 208 are portions of memory 110 configured to store game environments. Environment management engine 204 loads an environment to memory segment 206 from a disc in optical disc control unit 134. Environment management engine 204 loads another environment to memory segment 208 from the disc. One of memory segment 206 and memory segment 208 stores a current environment, while the other of memory segment 206 and memory segment 208 stores a next environment. Although two memory segments 206, 208 are shown in FIG. 2, any number of memory segments is within the scope of the invention.

Figure 3:
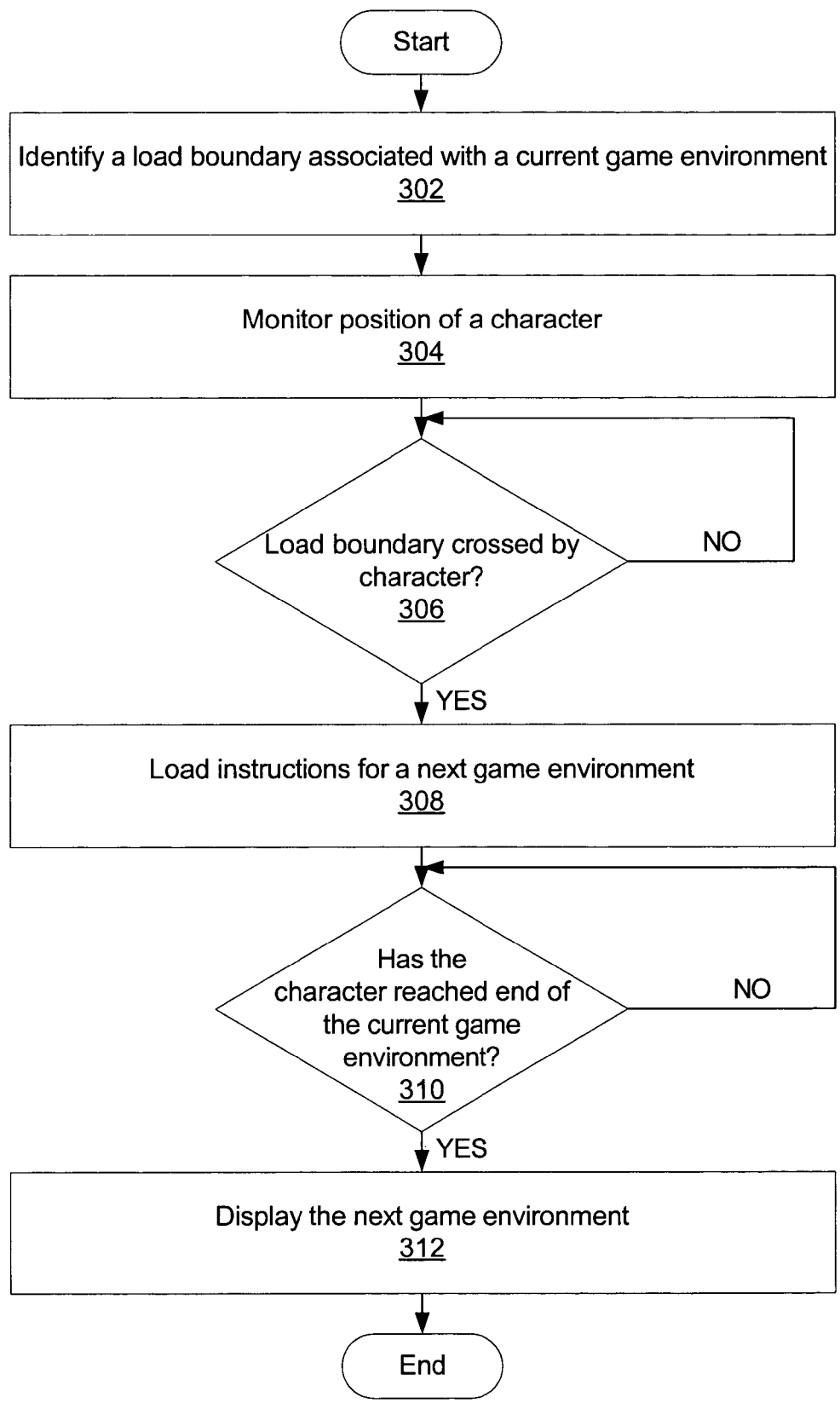
FIG. 3 is a flowchart illustrating dynamic loading of game software utilizing the environment management engine of FIG. 2 according to one embodiment of the invention.

FIG. 3 is a flowchart illustrating dynamic loading of game software utilizing environment management engine 204 of FIG. 2 according to one embodiment of the invention. In step 302, environment management engine 204 identifies a load boundary associated with the current game environment. The current game environment is generally the environment that the character is presently exploring. A load boundary is a threshold that, when reached or crossed by the character, indicates to environment management engine 204 that the next environment should be loaded to memory segment 206 or memory segment 208. A process of establishing a load boundary during production of game software 202 will be discussed in conjunction with FIG. 4.

Next, in step 304, environment management engine 204 monitors the position of a character in the current game environment. In order to monitor the position of the character, environment management engine 204 tracks input of a user. For instance, if the user moves the character forward, towards the next environment, this input is tracked by environment management engine 204. Similarly, if the user moves the character backwards, towards a previously executed environment, environment management engine 204 tracks this input. Accordingly, environment management engine 204 constantly tracks movements of the character in order to determine when the load boundary is crossed, or otherwise reached.

In step 306, environment management engine 204 determines whether the load boundary has been crossed by the character. If the character has not crossed the load boundary, environment management engine 204 continues to query whether the boundary has been crossed until environment management engine 204 determines that an affirmative response can be returned. When the character has crossed the load boundary, environment management engine 204 loads a next game environment into the one of memory segment 206 or memory segment 208 that does not hold the current game environment, in step 308. The next game environment becomes the current game environment when the character enters the environment. Accordingly, the current game environment becomes a previous environment when the character enters the next environment.

When the character crosses, or reaches, the load boundary, environment management engine 204 is triggered to load the next game environment. Generally, triggers to load the next game environment include situations in which the user can see the next environment or the user will soon need the next environment, or previous environment where appropriate, as discussed herein. The load boundary is a trigger that may represent these situations.

As stated above, in step 308, environment management engine 204 loads the next environment to either memory segment 206 or memory segment 208 from the disc in optical disc control unit 134 (FIG. 1). Since it is assumed that the character is progressing forward in the game, the next environment is the environment that is loaded. However, if the character regresses in the game, the previously executed environment will be re-loaded. In other words, if the user chooses to move the character backwards, away from the next environment, the load boundary will be crossed in the backwards direction and environment management engine 204 will load the previously executed environment in order to allow the user to return the character to the previously executed environment should the user choose such a route.

In step 310, environment management engine 204 determines whether the character has reached an end of the current game environment. If the character has not reached the end of the current game environment, environment management engine 204 continues to query whether the character has reached the end of the current game environment until a positive answer can be established. If the character has reached the end of the current game environment, the next game environment is displayed in step 312.

Figure 4:
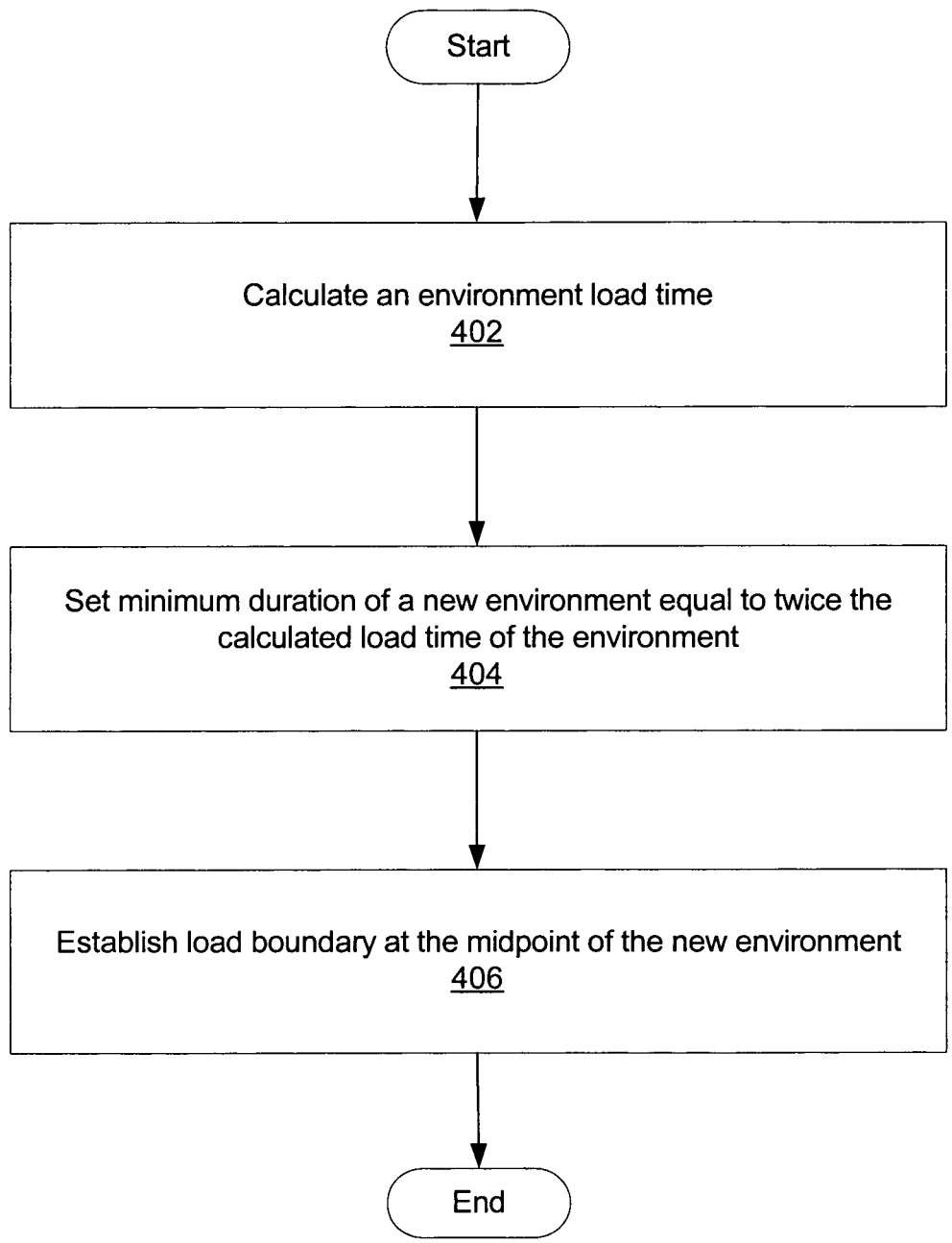
FIG. 4 is a flowchart illustrating a process for establishing a load boundary according to one embodiment of the invention.

FIG. 4 is a flowchart illustrating a process for establishing a load boundary according to one embodiment of the invention. The FIG. 4 process for establishing a load boundary relates to processes performed during design and production of game software 202 and/or environment management engine 204. In step 402, a designer calculates a load time for an environment. Load time is the amount of time, or duration of time, that is required to load instructions for a particular environment from a disc to memory 110. The load time for each environment typically varies, depending upon the complexity of the environment. The load time for each environment may be any length of time suitable for use with the invention. For instance, the load times for each environment may be equivalent or approximately equivalent. As another example, successive environments may require load times that are shorter in duration than preceding environments.

In step 404, the designer sets the minimum duration of a new environment equal to twice the calculated load time of the other environment. The minimum duration of the environment is measured as the least amount of time it takes a character to traverse the environment. The minimum duration is set to twice the load time of the other environment so that when the character passes through the midpoint of the environment, there will be sufficient time to load the next environment into memory segment 206 or memory segment 208.

In step 406, the designer establishes the load boundary at the midpoint of the new environment. By establishing the load boundary at the midpoint of a current environment (e.g., the new environment), initiation of loading for a next environment can proceed when this midpoint is reached or crossed by the character. Because loading time of the next environment is equal to or less than half of the running time of the current environment, loading of the next environment will be completed by the time the character reaches the end of the current environment. Thus, the user can seamlessly enter the character into the next environment without experiencing interruption or delay. Further, the user will not notice any transitioning time from the current environment to the next environment. Although FIG. 4 illustrates a process for establishing a boundary that is at the midpoint of the environment, any process for establishing a boundary may be utilized in accordance with the invention.

Due to the creation of a midpoint as a load boundary, the user can move the character to any one of many environments from a particular midpoint. In other words, the character need not move from the current environment to the next environment in a linear manner. As discussed herein, the user does not necessarily proceed to the immediate successor environment with respect to level of difficulty. The midpoint of each environment is far enough away from the other environments that instructions for that game environment will be loaded to memory segment 206 or memory segment 208 by the time the character reaches one of the other environments.

In another embodiment of the invention, continuation points may be established. Continuation points trigger the process of loading the next environment to continue, or otherwise be maintained. Thus, when the character crosses continuation points, the next environment continues to be loaded into level memory 206 or level memory 208. In this embodiment, loading of the next environment may cease if the character fails to cross a particular continuation point. As many or as few continuation points as desired may be established in any game environment. The continuation points may act as a trigger to continue the next environment loading process and/or the continuation points may be utilized to help monitor the position of the character.

Figure 5:
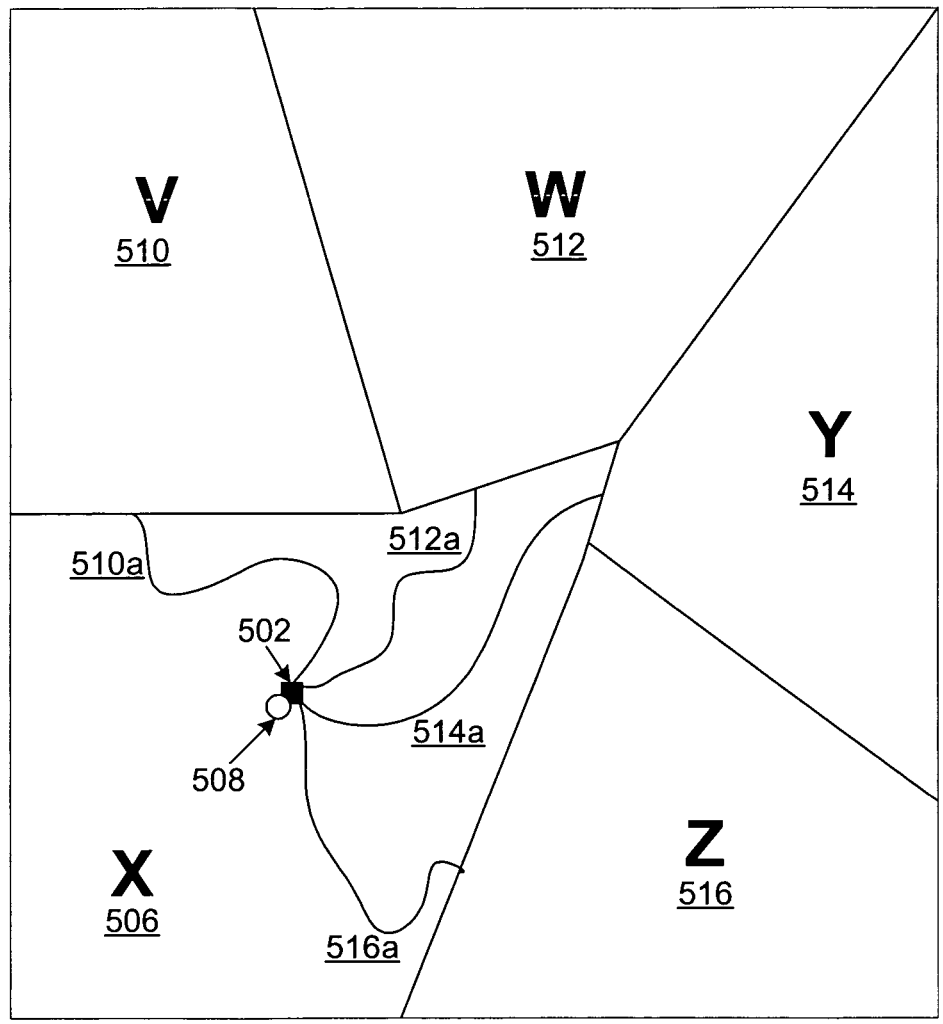
FIG. 5 is a diagram of exemplary game environments according to one embodiment of the invention.

FIG. 5 is a diagram of game environments according to one embodiment of the invention. The user is allowed to move character 508 towards environment "V" 510 via virtual hallway 510a, "W" 512 via virtual hallway 512a, "Y" 514 via virtual hallway 514a, or "Z" 516 via virtual hallway 516a. Thus, the user can move character 508 to any number of environments from load boundary 502 in environment "X" 506. While the user can move character 508 to any number of environments, the user can see only two environments at a time, as well as a low resolution of a third environment, where desired, or as otherwise appropriate.

Character 508 crosses load boundary 502 into one of the virtual hallways. The virtual hallway that character 508 enters indicates to the environment management engine 204 which environment should be loaded next. For instance, if character 508 enters virtual hallway 514a, environment management engine 204 loads environment "V" 514 to memory segment 206 or memory segment 208. Other environments may have more or fewer virtual hallways. In FIG. 5, for example, environment "V" 514 only has two virtual hallways (not shown) because character 508 can only move towards environment "X" 506 or environment "W" 512 from environment "V" 514. Each virtual hallway is a defined area, such as a pathway. Accordingly, character 508 cannot traverse outside the virtual hallway, directly to another virtual hallway, for example.

Seamless transitioning from one environment to another is accomplished by switching back and forth between game environments stored in memory segment 206 and memory segment 208. Because there are two or more memory segments 206 and 208, the user's character can be in one level and either one other level or no other level is visible to the user. By configuring memory 110 to include memory segment 206 and memory segment 208, a "virtual hallway," such as the virtual hallways illustrated in FIG. 5, is created. Unlike traditional "hallways," the virtual hallway is a level unto itself. Accordingly, each environment essentially has no borders. The user moves the character from one environment to another environment without delay or interruption in game play.

Figure 6:
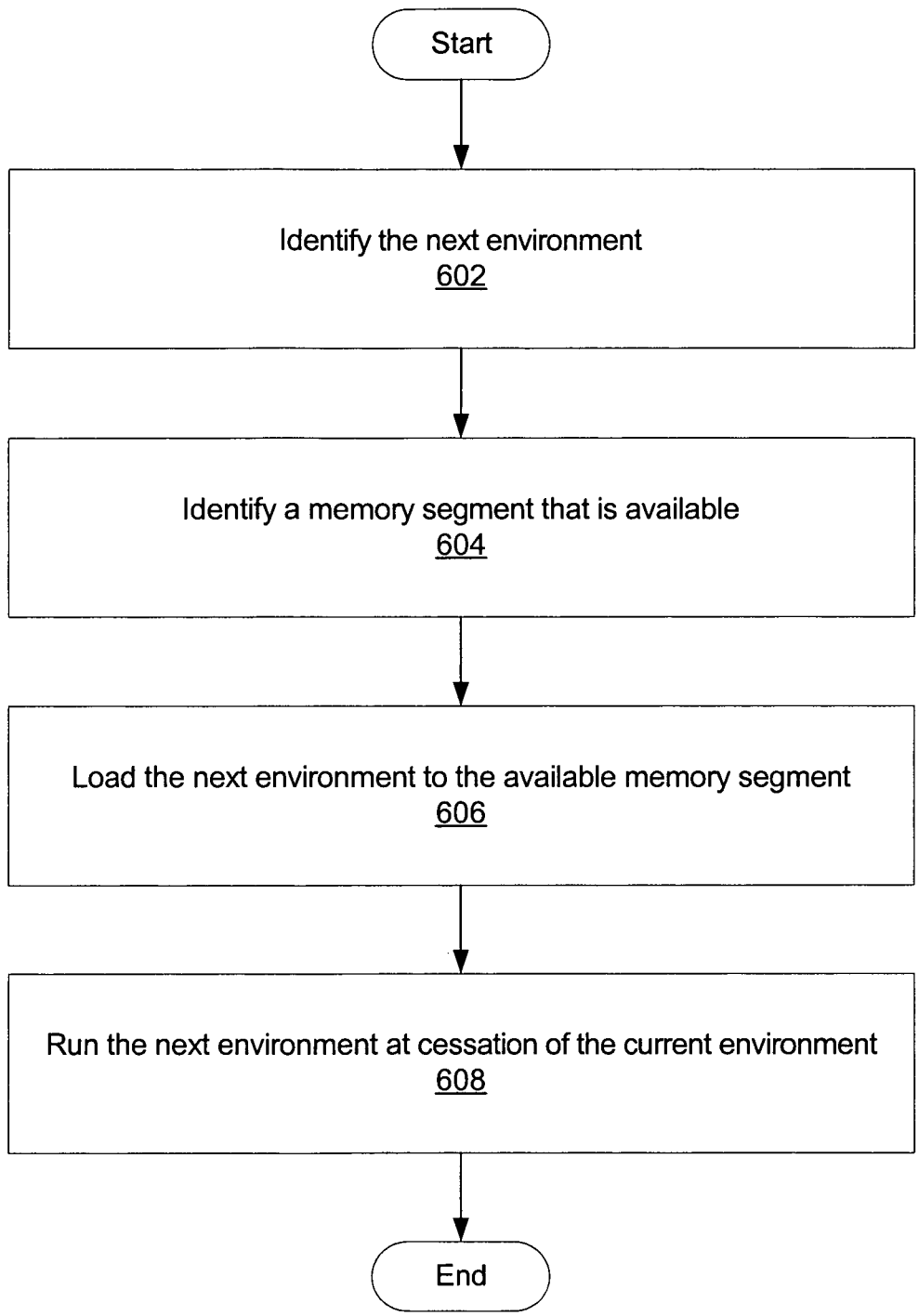
FIG. 6 is a flowchart illustrating a process for loading game software for the next environment according to one embodiment of the invention.

FIG. 6 is a flowchart illustrating a process for loading game software for the next environment in accordance with an embodiment of the invention. In step 602, environment management engine 204 identifies the next environment 602. The next environment may be any environment accessible to the character from the current environment. In other words, the next environment is not necessarily the next immediate successor environment following the current environment. The next environment may skip an environment or level, skip two environments, skip no environments, and so on.

In step 604, environment management engine 204 identifies an available memory segment. In one embodiment, one of memory segment 206 and memory segment 208 does not include the current environment. In step 606, environment management engine 204 loads the next environment to the available memory segment. For example, memory segment 206 (FIG. 2) may contain a previously executed environment and thus, is available to receive the next environment, while memory segment 208 stores the currently executing environment.

When the midpoint of the currently executed environment is crossed by the character, environment management engine 204 loads the next environment into memory segment 206 over the previously executed environment. As discussed herein, if the user causes the character to turn around and run back towards the previously executed environment, the character would cross the midpoint load boundary again, in the opposite direction. The midpoint load boundary being crossed by the character causes the previously executed environment to be loaded to memory segment 206 again.

Depending upon the location of the character with respect to the midpoint, the user can observe the currently executed environment and either the next environment or the previous environment. In other words, if the character is in a location in the current environment prior to the midpoint thereof, the user can view the previous environment as well as the current environment. However, if the user's character is located in the current environment after the midpoint of the current environment, the user can see the next environment ahead, as well as the current environment, but not the previous environment.

In order to accomplish this type of display prior to completion of loading the previous or the next environment, a portion of the particular environment is displayed before or after the current environment, depending upon the location of the character. In other words, only a fraction of the particular environment towards which the character is progressing is displayed to the user. Thus, the user can observe the particular environment. Since an environment will be loaded and ready to be fully displayed by the time the character reaches the particular environment, the character can enter the particular environment when the particular environment is reached by the character.

In step 608, the next environment is run at the cessation of the current environment. As discussed herein, the next environment is loaded when the character crosses the load boundary of the currently executing environment. Thus, when the character reaches the end of the currently executing environment, the next environment is already loaded and is ready to run. By dynamically loading each next environment, the user experiences smooth game play since no pause or interruption in the game occurs. As discussed herein, traditionally, the user waited for the next environment to load at the conclusion of the current environment, a "loading" or blank screen displayed to the user during this game delay. The invention offers smooth game play to the user by pre-loading the next environment, avoiding the game interruptions and delays of prior art gaming software.

In one embodiment of the invention, three environments, or portions of the environments, may be displayed at a particular time. In order to accomplish the presentation of three levels at a time, low resolution versions of particular environments are displayed. In other words, low resolution versions of previous levels or levels that the user should be able to see from any environment are displayed.

For example, as a character proceeds through a city, two environments of the city are viewable at a time, as discussed herein. However, the user should be able to see the tops of the buildings within the city from any environment within the city. Accordingly, low resolution versions of the tops of buildings are displayed to the user in addition to the two other environments.

In addition, as a character moves through an environment, various details related to that environment may be loaded to memory 110 and released as appropriate. For instance, speech for a specific person in the environment may be triggered if the character approaches the specific person. The software for speech for the specific person is loaded to memory 110 and executed when the character approaches the person. Depending upon the current environment, the software for speech for the person may be loaded to memory segment 206 or memory segment 208. When the character moves away from the person, the software for speech for that person is released. Conversely, if the character fails to approach the person, speech software for the person is not loaded to memory 110. Thus, details can be added to the particular environment without taxing the system by utilizing vast amounts of memory.

Figure 7:
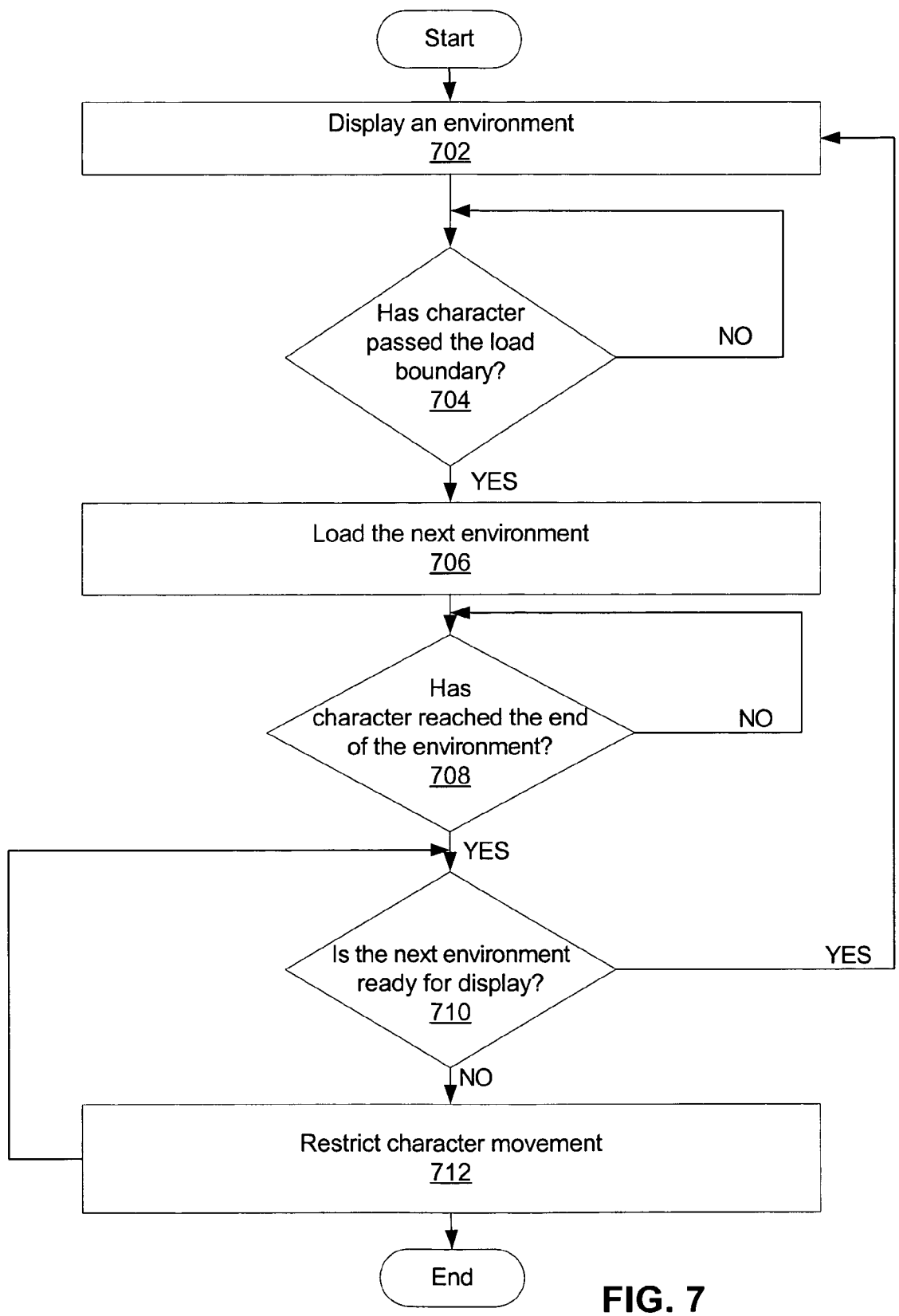
FIG. 7 is a flowchart illustrating a process for preventing a user from viewing a non-environment display according to one embodiment of the invention.

FIG. 7 is a flowchart illustrating a process for preventing a user from viewing non-environment display according to one embodiment of the invention. In step 702, environment management engine 204 displays an environment. The environment may be a currently executed environment or a next environment, for which execution is commencing.

In step 704, environment management engine 204 determines whether the character has passed the load boundary. If the character has not passed the load boundary, environment management engine 204 continues to inquire as to whether or not the load boundary has been passed by the character until the character has passed the load boundary. Once the character has passed the load boundary, the environment management engine 204 loads the next environment to memory segment 206 or memory segment 208, in step 706.

In step 708, environment management engine 204 determines whether the character has reached the end of the environment being displayed in step 702. If the character has not reached the end of the environment, environment management engine 204 continues to monitor the position of the character in order to determine when the character reaches the end of the environment. When the character has reached the end of the environment, environment management engine 204 determines whether the next environment is ready for display, in step 710. If the next environment is ready for display, environment management engine 204 displays the next environment, in step 702. The FIG. 7 process continues until the game ends.

However, as shown in FIG. 7, if the next environment is not ready for display, environment management engine 204 restricts the character's movement, in step 712. For example, environment management engine 204 may cause the character to trip and fall, and to be unmovable by the user. Once the character's movement has been restricted, such as by tripping and falling, environment management engine 204 continues to query whether the next environment is ready for display (step 710).

If the next environment becomes ready for display, the next environment is displayed, in step 702, and the character is once again movable. The next environment may be delayed with respect to availability for display due to an old system, for example, that takes longer than expected to load the next environment. As another example, the DVD ROM may have a skip or other problem that causes delays in loading the next environment. Any number of problems may contribute to a delay in loading the next environment.

However, if the next environment fails to become available for display, the character will remain unmovable, indicating to the user that there is a system 100 malfunction of some type. Most commonly, the user's DVD ROM is severely scratched or permanently damaged, preventing proper loading of the next environment. Further, the user's DVD ROM drive itself may be damaged or destroyed, precluding loading of the next environment. Any number of problems may prevent loading of the next environment altogether. Accordingly, the character remains unmovable by the user in such a scenario in order to prevent the user from viewing non-environment display. Because the DVD ROM, DVD ROM drive, etc. is ruined, the user is unable to play the game regardless. Thus, rendering the character unmovable does not present an obstacle to commencement of the game.

The invention has been explained above with reference to specific embodiments. Other embodiments will be apparent to those skilled in the art in light of this disclosure. The invention may readily be implemented using configurations other than those described in the preferred embodiments above. Additionally, the invention may effectively be used in conjunction with systems other than the one described above. Therefore, these and other variations upon the described embodiments are intended to be covered by the invention, which is limited only by the appended claims.

What is claimed is:

1. A method for dynamically loading game software, the method comprising:
   generating a display of a current game environment, wherein the current game environment is associated with a plurality of next game environments;
   determining a load time for each of the plurality of next game environments, wherein the next game environments are not yet displayed;
   identifying in the current game environment a plurality of different load boundaries that are each associated with loading one or more of the plurality of next game environments, wherein the location of each load boundary in the current game environment is based on the load time of the associated next game environment;
   identifying that a character has crossed a load boundary in the current game environment associated with one of the plurality of next game environments;
   determining a direction in which the character has crossed the crossed load boundary;

identifying one of the next game environments for loading based on the crossed load boundary and the determined direction in which the character has crossed the load boundary, wherein the next game environment associated with the load boundary is identified for loading when the character is determined to have crossed the load boundary moving in a forward direction toward one of the next game environments associated with the load boundary, and a different next game environment is identified for loading when the character is determined to have crossed the load boundary in a backward direction away from the one of the next game environments associated with the crossed load boundary; and loading instructions corresponding to the identified next game environment into a memory prior to the character entering the identified next game environment, loading of the instructions commencing when the character crosses the load boundary in the current game environment in the determined direction such that game play is not interrupted by loading instructions for display of the identified next game environment when the character enters the identified next game environment.

2. The method of claim 1, further comprising configuring the memory to include at least two memory segments.

3. The method of claim 2, wherein the current game environment is stored in one of the at least two memory segments and the identified next game environment associated with the crossed load boundary is stored in another of the at least two memory segments.

4. The method of claim 1, wherein the identified next game environment an immediate successor level to the current game environment.

5. The method of claim 1, further comprising restricting movement of the character if loading instructions corresponding to the identified next game environment associated with the crossed load boundary is not completed.

6. The method of claim 1, wherein a portion of the identified next game environment is displayed while the character traverses the current game environment.

7. The method of claim 1, wherein the crossed load boundary passes through a midpoint of the current game environment.

8. The method of claim 1, further comprising identifying a set of continuation points associated with each next game environment in the current game environment.

9. The method of claim 8, further comprising continuing the loading of the instructions corresponding to the identified next game environment when the character crosses one of the set of continuation points associated with the identified next game environment.

10. The method of claim 1, wherein the character is determined to have crossed the crossed load boundary in the backward direction and wherein loading instructions for the identified next game environment comprises loading instructions corresponding to a previous game environment.

11. A system for dynamically loading game software, the system comprising:

an environment management engine stored in main memory, the environment management engine executable by a processor to:

generate a display of a current game environment, wherein the current game environment is associated with a plurality of next game environments, determine a load time for each of the plurality of next game environments, wherein the next game environments are not yet displayed, identify in the current game environment a plurality of different load boundaries that are each associated with loading one or more of the plurality of next game environments, wherein the location of each of the load boundaries in the current game environment is based on the load time of the associated next game environment, identify that a character has crossed one of the plurality of different load boundaries in the current game environment;

determine a direction in which the character has crossed the crossed load boundary;

identify one of the next game environments for loading based on the crossed load boundary and the direction in which the character has crossed the load boundary, wherein the next game environment associated with the load boundary is identified for loading when the character is determined to have crossed the load boundary moving in a forward direction toward one of the next game environments associated with the load boundary, and a different next game environment is identified for loading when the character is determined to have crossed the load boundary in a backward direction away from the next game environment associated with the crossed load boundary; and load instructions corresponding to the identified next game environment prior to the character entering the identified next game environment, loading of the instructions commencing when the character crosses the load boundary in the current game environment in the determined direction such that game play is not interrupted by loading instructions for display of the identified next game environment when the character enters the identified next game environment; and at least two memory segments configured to store instructions for the current game environment and for receiving and storing the instructions corresponding to the next game environment.

12. The system of claim 11, wherein at least one of the current game environment, the next game environment associated with the crossed load boundary, and a previous environment are executed from different memory segments among the at least two memory segments.

13. The system of claim 12, wherein the next game environment associated with the crossed load boundary is loaded to one of the at least two memory segments by writing over the previous game environment in the one of the at least two memory segments.

14. The system of claim 12, wherein the identified next game environment is the previous environment, and wherein the identified next game environment is loaded to one of the at least two memory segments by writing over the next game environment associated with the crossed load boundary.

15. The system of claim 11, wherein one of the at least two memory segments stores the current game environment and another of the at least two memory segments stores the identified next game environment.

16. The system of claim 11, wherein the crossed load boundary passes through a midpoint of the current game environment.

17. The system of claim 11, wherein the environment management engine is further executable to identify a set of continuation points associated with each next game environment.

18. The system of claim 17, wherein the character crossing continuation points associated with the identified next game environment associated with the crossed load boundary trigger the continued loading of the instructions corresponding to the identified next game environment associated with the crossed load boundary.

19. A non-transitory computer-readable storage medium having embodied thereon a program, the program being executable by a processor to perform a method for dynamically loading game software, the method comprising:

generating a display of a current game environment, wherein the current game environment is associated with a plurality of next game environments;

determining a load time for each of a plurality of next game environments, wherein the next game environments are not yet displayed;

identifying in the current game environment a plurality of different load boundaries that are each associated with loading one or more of the plurality of next game environments, wherein the location of each of the plurality of load boundaries in the current game environment is based on the load time of the associated next game environment;

identifying that a character has crossed one of the plurality of different load boundaries in the current game environment;

determining a direction in which the character has crossed the crossed load boundary;

identifying one of the next game environments for loading based on the crossed load boundary and the direction in which the character has crossed the load boundary, wherein the next game environment associated with the load boundary is identified for loading when the character is determined to have crossed the load boundary moving in a forward direction toward one of the next game environments associated with the load boundary, and a different next game environment is identified for loading when the character is determined to have crossed the load boundary in a backward direction away from the next game environment associated with the crossed load boundary; and loading instructions corresponding to the identified next game environment into a memory prior to the character entering the identified next game environment, loading of the instructions commencing when the character crosses the load boundary in the current game environment in the determined direction such that game play is not interrupted by loading instructions for display of the identified next game environment when the character enters the identified next game environment.

\* \* \* \* \*